US005590254A

United States Patent [19]

Lippincott et al.

[11] Patent Number: 5,590,254

[45] Date of Patent: Dec. 31, 1996

[54] DISPLAYING MULTIPLE VIDEO STREAMS USING A BIT MAP AND A SINGLE FRAME BUFFER

[75] Inventors: Louis A. Lippincott, Roebling, N.J.; Thomas R. Craver, Chandler, Ark.

[73] Assignee: Intel Corporation, Santa Clara, Calif.

[21] Appl. No.: 316,605

[22] Filed: Sep. 30, 1994

[51] Int. Cl.[6] .................. G06T 11/00

[52] U.S. Cl. .................. 395/135

[58] Field of Search .................. 395/135, 133, 395/152–154, 155, 161, 164–166; 358/183; 348/584–592

[56] References Cited

U.S. PATENT DOCUMENTS

| | | | |
|---|---|---|---|
| 4,599,611 | 7/1986 | Bowker et al. | 358/183 X |
| 5,432,900 | 7/1995 | Rhodes et al. | 395/154 |
| 5,434,590 | 7/1995 | Dinwiddie, Jr. et al. | 395/154 X |

*Primary Examiner*—Almis R. Jankus
*Attorney, Agent, or Firm*—N. Stephan Kinsella; William H. Murray

[57] ABSTRACT

A method and apparatus for processing signals for display using a single frame buffer. In a preferred embodiment, a plurality of pixels are received, wherein one or more of the plurality of pixels corresponds to a first display and one or more of the plurality of pixels corresponds to a second display. A display bit map and a display mask are generated in accordance with the plurality of pixels. If a pixel of the plurality of pixels corresponds to the first display and a corresponding mask field of the display mask has a first-display value, then the pixel is stored in the display bit map, wherein the mask field comprises at least one mask bit. Otherwise, if the pixel corresponds to a key color, then the mask field corresponding to the pixel is set to the first-display value. Otherwise, the pixel is stored in the display bit map and the mask field corresponding to the pixel is set to a second-display value.

48 Claims, 4 Drawing Sheets

DISPLAYING MULTIPLE VIDEO STREAMS USING A BIT MAP AND A SINGLE FRAME BUFFER

BACKGROUND OF THE INVENTION

1. Field of the Invention

The present invention relates to display processors and, in particular, to computer-implemented processes and apparatuses for processing two or more display streams for display on a single display monitor.

2. Description of the Related Art

It is known to use computer processors for displaying still and motion video images on monitors. It is also known to display graphics such as computer-generated graphics icons, text, or menus along with video images by occluding (i.e., superimposing) the graphics display over portions of the video images.

Referring now to FIG. 1, there is shown a block diagram of a prior art system 100 for simultaneously displaying video images and graphics displays on a monitor 101. As shown in FIG. 1, video frame 103 of a human face 103*a* is displayed with a graphics display such as graphics display 102 occluding a portion of video frame 103. Graphics display 102 contains computer-generated icons 102*a* which a user may choose with a mouse to manipulate the video being displayed. As video images are updated, the display graphic may remain displayed on monitor 101 without changing.

To display a video image on a monitor, such as a video frame 103, it is known to store each video frame in a single frame buffer of a memory device 111. For example, to display an [N×M] video frame, where each pixel is represented by 16 bits of RGB data, each video frame may be stored in a single frame buffer of size N×M with a depth of 16 bits. If the video display is updated with new video frames at a rate of, for example, 15 frames per second, every 15th of a second or so a new video frame is stored in the single frame buffer for display on the monitor.

Where a graphics display such as graphics display 102 is to be displayed along with or "on top of" the video display such that graphics display 102 partially or completely occludes the current video frame 103 of the video, the computer processor or a graphics display controller may store the graphics display in a portion of the single frame buffer corresponding to the portion of the monitor screen where the graphic is to be located.

Video application 110 and graphics applications 109 may run, for example, on a host processor 108. First, video application 110 may store video frame 103 in the single frame buffer 111. Next, graphics application 109 may store graphics display 102 over a portion of video frame 103. A problem arises in the next cycle when video application 109 updates the video display, because graphics display 102 would be overwritten. Thus, graphics display 102 would display for only one cycle, and would only appear as a flash to a user. This problem of a graphics display being overwritten when the video display is updated is known as "clobber".

Referring now to FIG. 2, there is shown a graphical representation of a prior art dual frame buffer 200 used in the system of FIG. 1. It is known to use dual-frame buffer 200 (also known as a single active frame buffer) to display both graphics and video displays on a monitor to avoid the problem of clobber. Dual-frame buffer 200 consists of two single frame buffers: video frame buffer 201 and graphics frame buffer 202. Video frame buffer 201 may be, as discussed above, a 16-bit [N×M] buffer for storing individual video frames 103. Since graphics 102 can potentially fill the entire screen of monitor 101, graphics frame buffer 202 is also [N×M], but typically has a depth of only 8 bits. A key color is selected that may not be used as a graphics color. Instead, the key color may be used by graphics display controller 106 to determine when to show video pixels from video frame buffer 201 and when to show graphics pixels from graphics frame buffer 202 for a given pixel location. For example, in an 8-bit graphics frame buffer 202, there are $2^8$ possible color/intensity combinations for each pixel, one of which can be selected as a key color that may not be used as a graphics color.

A key color in a pixel of graphics frame buffer 202 indicates that pixel location belongs to or is "owned" by the video application. Each pixel of graphics frame buffer 202 except those that correspond to graphics displays contains the key color. For example, the pixels within graphics display 102 in graphics frame buffer 202 may be any color except the selected key color, whereas each pixel of graphics frame buffer 202 outside graphics display 102 contains the key color. After video application 110 stores a new video frame 103 in video frame buffer 201, graphics display controller 106 combines the two buffers' data to display graphics display 102 occluding a portion of new video frame 103. In order to do this, graphics display controller 106 displays a video pixel if graphics frame buffer 203 for the corresponding location contains the key color; otherwise, the graphics pixel is displayed instead. In this manner, through the use of key colors and dual frame buffer 200, clobber is avoided and video and graphics are displayed together. However, use of a dual frame buffer such as dual frame buffer 200 utilizes more memory than a single frame buffer.

Referring now to FIG. 3, there is shown a graphical representation of a prior art single frame buffer 300 used in system 100 of FIG. 1. To avoid the problem of clobber and also avoid the higher use of memory of a dual frame buffer, it is also known to use a bit mask plane 302 with single frame buffer 300. In this implementation, an [N×M] single-bit mask plane 302 is used to inform graphics display controller 106 whether or not to update pixels of the single frame buffer 300 when the video and/or graphics displays are updated.

As illustrated in FIG. 3, if single frame buffer 300 is 16 bits deep, the 16th bit of the single frame buffer is typically used to store bit mask plane 302. The other 15 bits of each pixel location are used to store RGB data for each pixel, as illustrated by pixel 301 having mask bit 301*a*.

For example, at the start of a video display, if all of the pixels are owned by video application 110, then all of the mask bits of mask bit plane 302 will be in "set" condition, indicating that all of the pixels are owned by the video application. As such, each and every pixel in single frame buffer 300 is updated when a new video frame 103 is received. When graphics display 102 is to be displayed over a portion of video frame 103, graphics application 109 first "resets" the mask bits for the pixels where graphics display 102 will be displayed to indicate that those pixels are now owned by graphics application 109. Graphics application 109 then stores graphics display 102 in the appropriate location in single frame buffer 300. When another video frame 103 is generated, graphics display controller 106 updates only those pixels owned by video application 110, in order to avoid the clobber problem wherein any graphic stored in the single frame buffer would be overwritten by the new video frame. Thus, as single frame buffer 300 is repeatedly updated video frames are displayed on the monitor around graphics display 102 but without overwriting or clobbering graphics display 102.

When graphics application 109 wishes to remove graphics display 102 so that the entire video frame 103 is again to be displayed, graphics application 109 sets all the mask bits that were previously reset, so that these pixels will once again be owned by video application 110. As such, when video frame 103 is updated, all the pixels will be owned by video application 110 and the next video frame 103 will overwrite graphics display 102 stored in single frame buffer 300.

One problem with this conventional method of using a mask bit plane 302 within single frame buffer 300 is the delay between (1) the resetting of mask bits to claim ownership for graphics application 109, and (2) the subsequent storing of graphics display 102 in single frame buffer 300. During this interval, graphics display 102 has not yet been stored in single frame buffer 300. If during this interval video frame 103 is updated, the region corresponding to the location of the graphics display will not be updated because these pixels will be owned by graphics application 109. Thus, for at least one frame-updating cycle, the region corresponding to graphics display 102 will contain a portion the prior video frame 103, while the rest of the single frame buffer corresponds to the new video frame 103. This causes undesirable display artifacts until graphics application 109 is able to store graphics display 102 in single frame buffer 300.

Therefore, in the known art using a dual frame buffer to overcome the problem of clobber involves excessive or wasteful memory usage. Also, use of a mask bit plane within a single frame buffer to overcome the problem of clobber can cause the above-mentioned display artifacts.

It is accordingly an object of this invention to overcome the disadvantages and drawbacks of the known art and to display graphics and video while avoiding the problems of clobber, excessive memory usage, and the above-mentioned delay and display artifacts.

Further objects and advantages of this invention will become apparent from the detailed description of a preferred embodiment which follows.

SUMMARY OF THE INVENTION

The previously mentioned objectives are fulfilled with the present invention. There is provided herein a computer-implemented process and apparatus for processing signals for display using a single frame buffer. According to a preferred embodiment of the invention, a plurality of pixels are received, wherein one or more of the plurality of pixels corresponds to a first display and one or more of the plurality of pixels corresponds to a second display. A display bit map and a display mask are generated in accordance with the plurality of pixels. If a pixel of the plurality of pixels corresponds to the first display and a corresponding mask field of the display mask has a first-display value, then the pixel is stored in the display bit map, wherein the mask field comprises at least one mask bit. Otherwise, if the pixel corresponds to a key color, then the mask field corresponding to the pixel is set to the first-display value. Otherwise, the pixel is stored in the display bit map and the mask field corresponding to the pixel is set to a second-display value.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
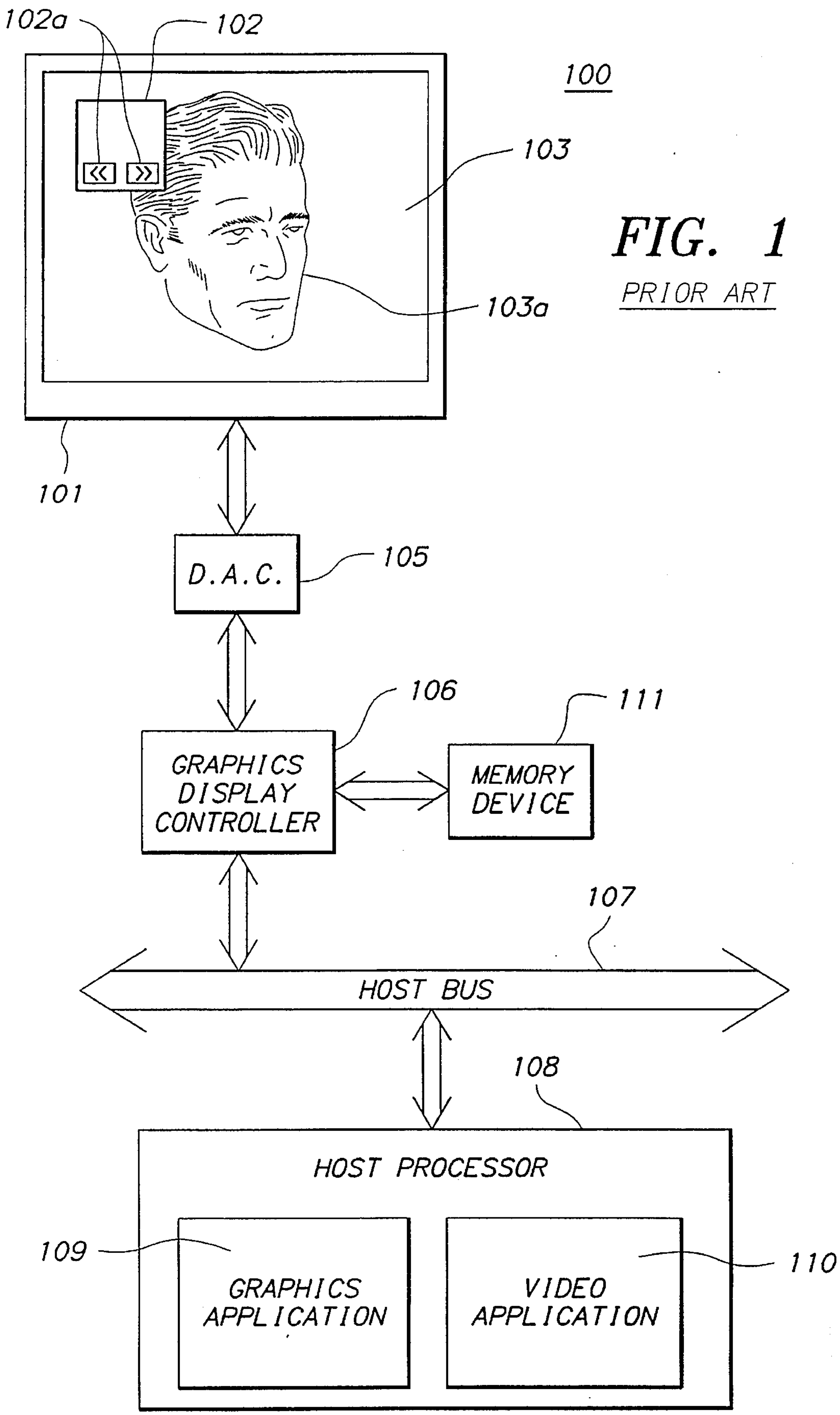
FIG. 1 PRIOR ART
FIG. 1 depicts a block diagram of a prior art system for displaying video and graphics on a monitor.
Figure 2:
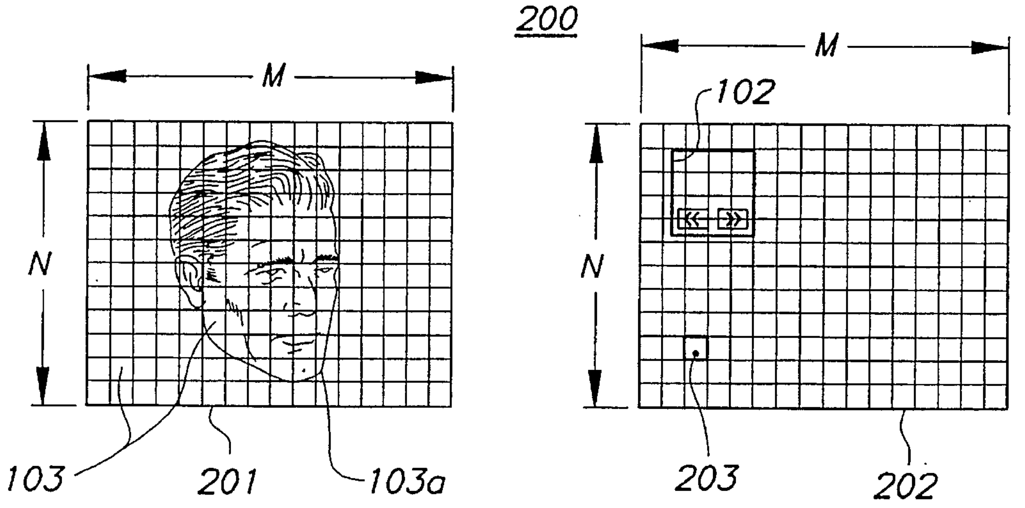
FIG. 2 PRIOR ART
FIG. 2 is a graphical representation of a prior art dual frame buffer used in the system of FIG. 1.
Figure 5:
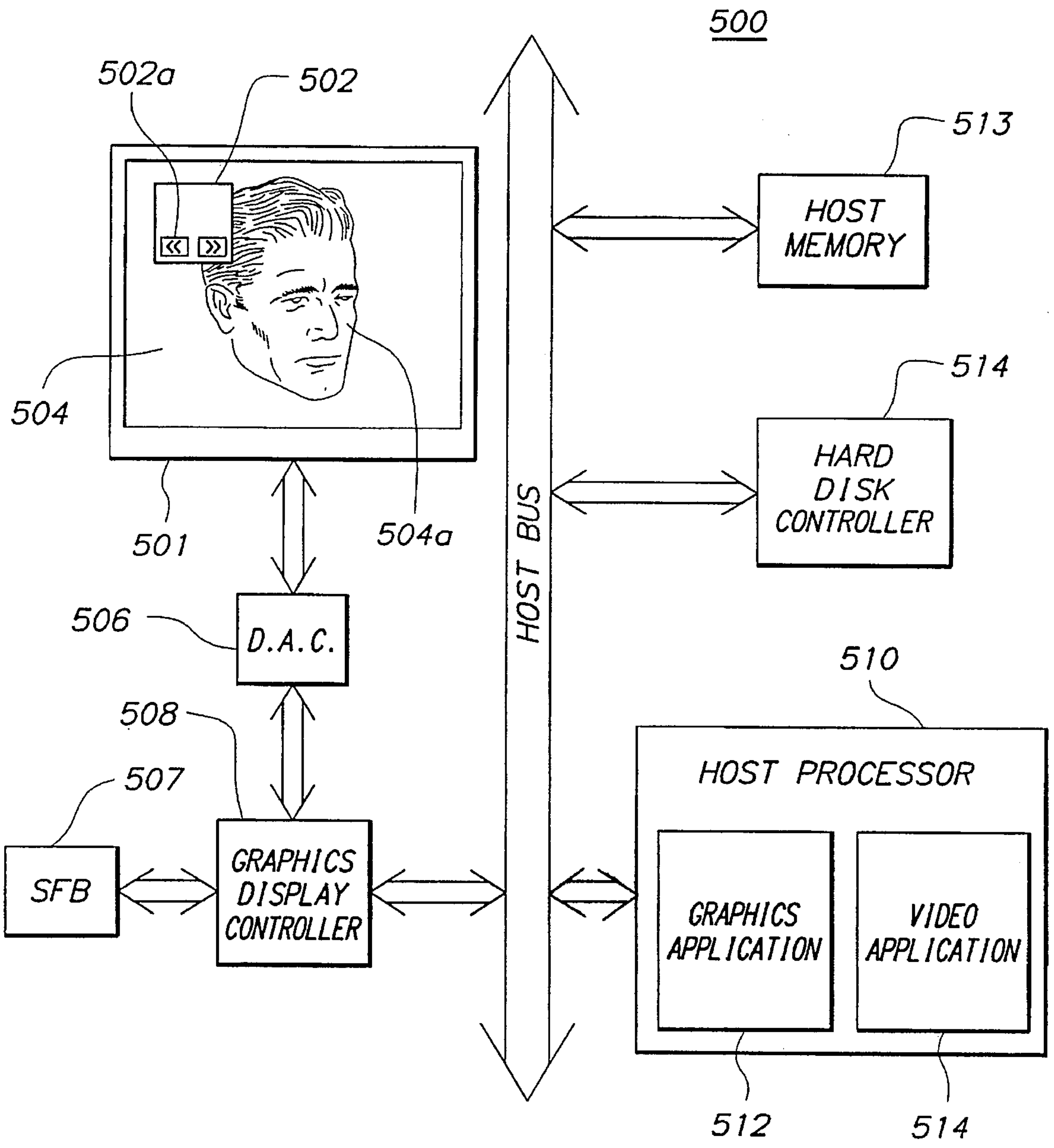
FIG. 5 depicts a block diagram of a preferred video system in accordance with the present invention.

Referring now to FIG. 5, there is shown a block diagram of a preferred video system 500 in accordance with the present invention. For convenience of illustration and for consistency with the description of the related art presented above, graphic 502 and video frame 504 displayed on monitor 501 are similar to graphics display 102 and video frame 103 discussed above in reference to FIG. 1.

Figure 3:
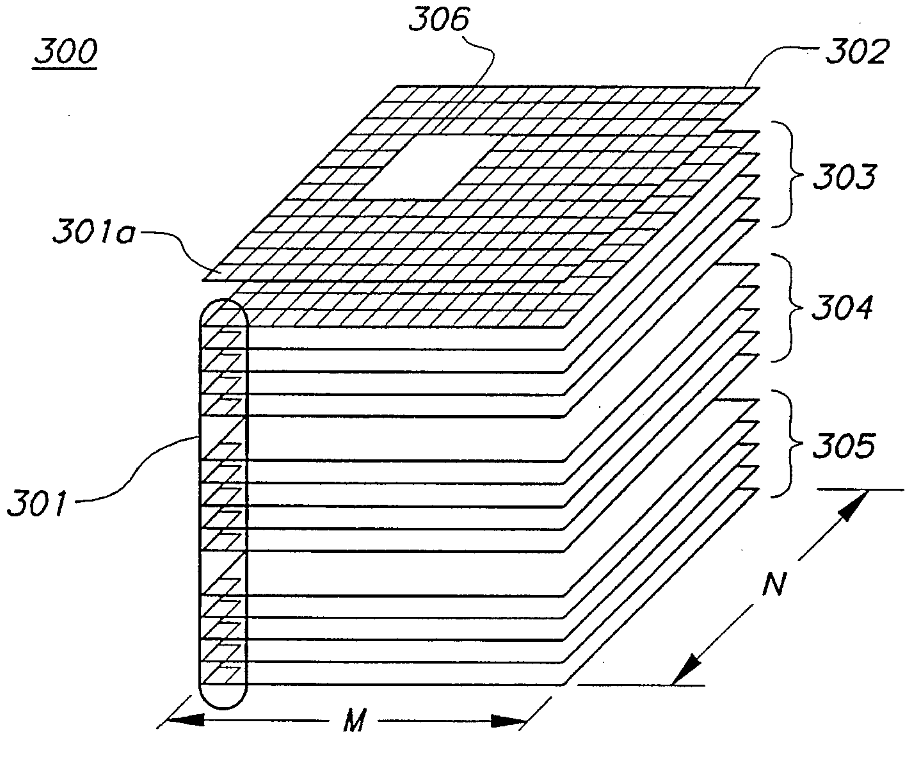
FIG. 3 PRIOR ART
FIG. 3 is a graphical representation of a prior art single frame buffer used in the system of FIG. 1.

Video system 500 comprises graphics display controller 508, which is connected to single frame buffer 507, digital-to-analog converter 506 (also sometimes referred to as a "D.A.C."), and host bus 509. Single frame buffer 507, as in single frame buffer 300 of FIG. 3, contains a mask bit plane that can store a mask bit for each pixel location in single frame buffer 507. Single frame buffer 507 also stores a 15-bit pixel for each pixel location, where each pixel stored in single frame buffer 507 corresponds to a unique mask bit of the mask bit plane. Digital-to-analog converter 506 is connected to monitor 501, which may be used to display images containing graphics displays such as graphics display 502 and video images such as video frame 504. Host processor 510 as well as host memory 513 and peripherals such as hard disk controller 514 are connected to host bus 509. Host processor 510 may run graphics application 512 and video application 514, which generate graphics and video pixels, respectively. These graphics and video pixels may be transmitted via host bus 509 to graphics display controller 508 for processing and display on monitor 501.

Graphics display controller 508 may be any graphics display controller suitable for receiving and processing video and graphics pixels from graphics and video applications such as graphics application 512 and video application 514, and is preferably a custom designed ASIC (application-specific integrated circuit). Single frame buffer 507 may be any memory device suitable for storing a bitmap to display a screenful of pixels on a monitor, and is preferably an array of video random access memory (VRAM) devices such as 256 k×4 VRAMs. Digital-to-analog converter 506 may be any D.A.C. suitable for converting pixels from a digital bitmap into analog format for displaying the bitmap on a monitor, and is preferably a 16 bit RGB D.A.C. Host bus 509 may be any bus suitable for communication between components such as graphics display controller 508 and host processor 510, and is preferably an Industry Standard Architecture (ISA) bus. Monitor 501 may be any monitor suitable for displaying images received from digital-to-analog converter 506, and is preferably a VGA or better monitor. Host processor 510 may be any processor suitable for processing video and graphics applications, and is preferably an Intel® i386™, i486™, or Pentium™ processor. Host memory 513 may be any memory suitable for use with host processor 510 and is preferably a DRAM array. Hard disk controller 514 may be any hard disk controller suitable for use with host processor 510.

Figure 4:
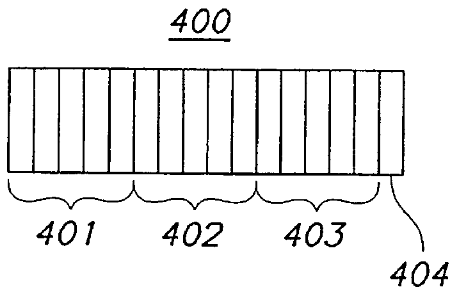
FIG. 4 depicts the elements of a pixel of the single frame buffer of the present invention.

Referring now to FIG. 4, there are shown the bits of a pixel 400 of the single frame buffer 507 of FIG. 5. Where the 16th bit is the mask bit 404, the other 15 bits are used for 5 bits each of red 401, green 402, and blue 403. The 16th bit used for mask bit 404 is taken from the six bits that would have been used for one of the RGB colors, usually green, without significant loss in dynamic range or image detail. The mask bit indicates whether the corresponding pixel is owned by video application 514 or by graphics application 512.

Figure 6:
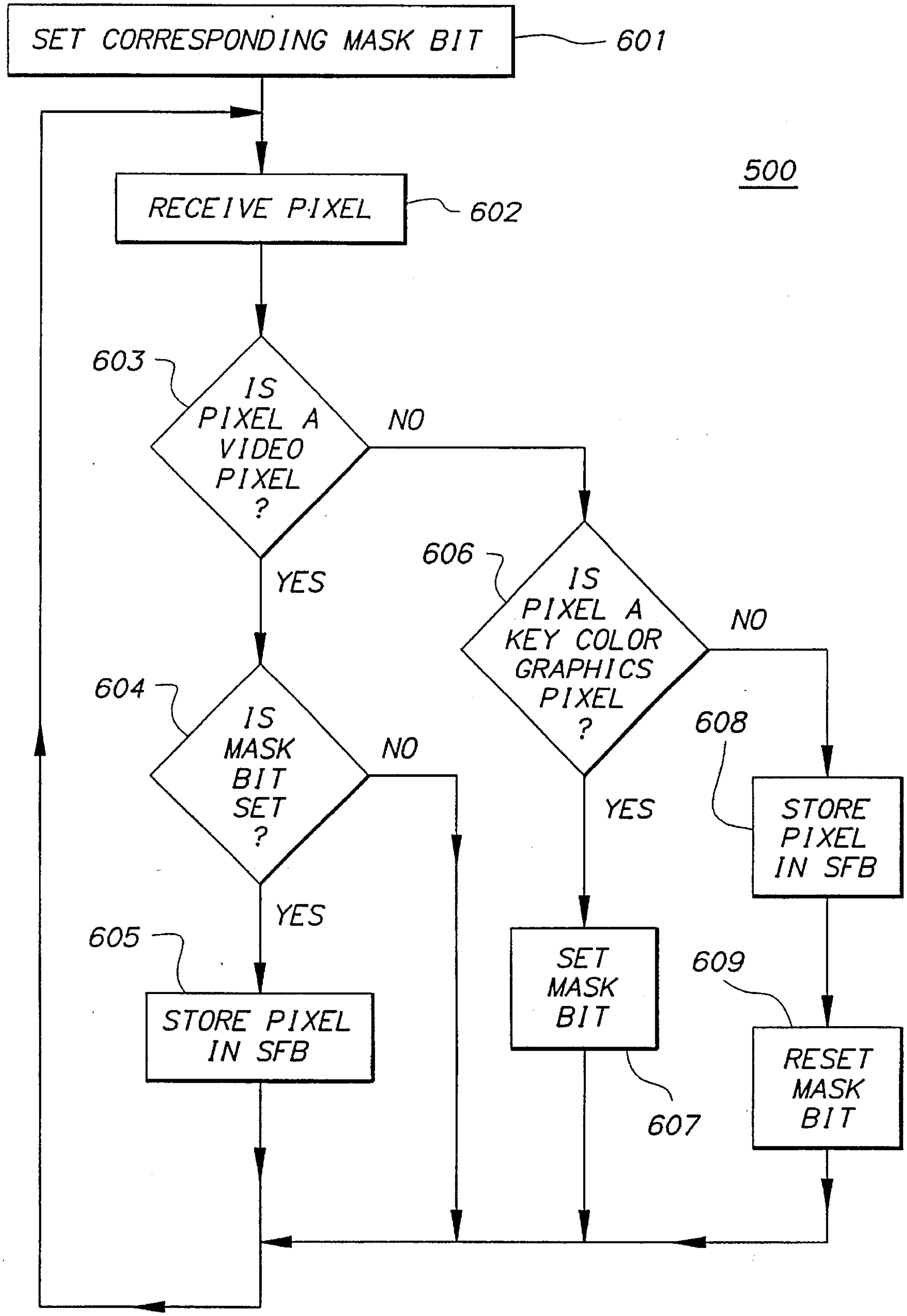
FIG. 6 is a flow chart of the method of operation of the video system of FIG. 5.

Referring now to FIG. 6, there is shown a flow chart of the method of operation of video system 500 of FIG. 5. The operation of video system 500 will first be described for a single pixel location. Initially, the mask bit of single frame buffer 507 corresponding to the pixel location is set, indicating that the pixel in single frame buffer 507 is owned by video application 514 (step 601 of FIG. 6). This allows a video frame such as video frame 504 to be displayed on monitor 501 by video application 514.

When a pixel value is received by graphics display controller 508 from host processor 510 (step 602) via host bus 509, graphics display controller 508 determines if the pixel was transmitted by video application 512 or by graphics application 514 (step 603). In other words, graphics display controller 508 determines whether the pixel received is a video or graphics pixel. It will be understood by those skilled in the art that such detection may utilize, for example, aliased addressing, in which additional information is appended to the pixel address, such as an extra bit, to indicate whether the pixel is a graphics or video pixel.

If the pixel is a video pixel, graphics display controller 508 determines if the corresponding mask bit in single frame buffer 507 is set (step 604). If the mask bit corresponding to the pixel is set, indicating that the pixel location in single frame buffer 507 is owned by video application 514, then the pixel is stored in that location in single frame buffer 507 (step 605). Otherwise, if the mask bit is reset (step 604), indicating that graphics application 512 owns the pixel location, the pixel is thrown away and is not stored in single frame buffer 507.

As used in this application, a "set" mask bit is a mask bit having a first-display value that indicates that the pixel location corresponding to the mask bit is owned by a first-display such as video application 514. With this usage, to set a mask bit is to set the mask bit to the first-display value. Also as used in this application, a "reset" mask bit is a mask bit having a second-display value that indicates that the pixel location corresponding to the mask bit is owned by a second-display such as graphics application 512. With this usage, to "reset" a mask bit is to set the mask bit to the second-display value.

If the pixel received is a graphics pixel rather than a video pixel (step 603), then graphics display controller 508 determines if the graphics pixel corresponds to the selected key color (step 606). If the graphics pixel is the key color, then the corresponding mask bit in single frame buffer 507 is set, to indicate that the pixel location in single frame buffer 507 is owned by video application 514 (step 607). In this manner, when a pixel location is no longer to be claimed by graphics application 512, graphics application 512 may transmit a key color graphics pixel which causes the mask bit to be set to indicate that the pixel location in single frame buffer 507 may now be used for video.

It will be appreciated by those skilled in the art that after or before the mask bit is set in step 607, the key color graphics pixel may also be stored, if desired, in single frame buffer 507, in which case the key color may be displayed on monitor 501 until overwritten by the next video frame. Those skilled in the art will also appreciate that the key color is a parameter that may be selected by the user or by the graphics application, and may be changed at any time if, for example, a displayed key color is desired to be changed to a second key color.

If the graphics pixel is not the key color (step 606), then the graphics pixel is stored in single frame buffer 507 (step 608) and the corresponding mask bit is automatically reset (step 609) to indicate that the pixel location is owned by graphics application 512.

The operation of video system 500 of FIG. 5 will now be illustrated with reference to a sequence in which initially only video is displayed on the monitor. Subsequently, a graphics display, superimposed over a portion of the video display, is opened and then later closed. The graphics and video displays, each contain a plurality of pixels that are processed by the method of FIG. 6. Initially, all mask bits are set, indicating ownership of all the pixel locations in single frame buffer 507 by video application 514. As new video frames are received, graphics display controller 508 stores all of the video pixels into single frame buffer 507. In an alternative preferred embodiment, all mask bits are reset initially, to indicate ownership of all pixel locations in single frame buffer 507 by graphics application 512.

To open graphics display 502, graphics application 512 transmits graphics pixels for the pixel locations of graphics display 502 to graphics display controller 508, where the graphics pixels may be of any color other than the selected key color. Graphics display controller 508 stores the graphics pixels in single frame buffer 507 and automatically resets the corresponding mask bits to indicate that these pixel locations in single frame buffer 507 are now owned by graphics application 512. When video application 514 transmits a new video frame 504, graphics display controller 508 stores and subsequently displays only those video pixels for locations owned by video application 514. Thus, graphics display 502 is maintained in single frame buffer 507 and therefore continues to be displayed on monitor 501 while video pixels around graphics display 502 continue to be updated as video frame 504 is updated.

To close graphics display 502, graphics application 512 transmits to graphics display controller 508 key color graphics pixels corresponding to the locations of graphics display 502. Graphics display controller 508 sets the mask bits for those locations to indicate ownership by video application 514, so that subsequent updates of video frame 504 may be stored in those locations, overwriting the graphics pixels previously stored there.

Although the preferred embodiment described herein discloses the use of the present invention to display graphics displays such as graphics display 502 along with video images such as video frame 504, it will be appreciated by those skilled in the art that the present invention may be used to process and display pixels received from sources of pixels other than from a video application and a graphics application. For example, video system 500 may receive from host processor 510 pixels from two video applications, or from two graphics applications, or, in general, from any first and second displays. It will further be appreciated by those skilled in the art that, for example, video images transmitted by a video application may be still images or a series of successive frames that constitute motion video.

It will also be understood by those skilled in the art that a video processor may be used instead of host processor 510 to run either or both of graphics application 512 and video application 514. For example, a video processor (not shown) may be connected to host bus 509, and may run video application 514 to transmit video frames to graphics display controller 508, while host processor 510 runs graphics application 512 as described hereinabove.

It will further be appreciated by those skilled in the art that the mask bit plane of single frame buffer 507, rather than being stored in a 16th bit of each memory storage space of the buffer, may be stored ill a separate single-bit [N×M] buffer, in which case all of the bits of single frame buffer 507 may be used to store pixel color component data. In this case, 16 bits are used for each pixel, and each pixel's mask bit is the "17th" bit. It will be appreciated by those skilled in the art that numbers of bits other than 16 may be utilized to represent a pixel, and that the bits of a pixel may be encoded in RGB format, as described above, or may utilize other suitable formats such as YUV or a color look-up table ("CLUT").

Those skilled in the art will understand that the present invention may be extended to process and display pixels from three or more sources. In such cases the display mask contains a mask field rather than a single mask bit per pixel. It will be understood that the expression "mask field" may represent a single mask bit as described hereinabove or a mask field having more then one bit. For example, with three video applications and one graphics application, a two-bit mask plane can represent which application "owns" the pixel, for example combination "00" could represent graphics ownership of the pixel location, in which case any video pixel is not stored in the buffer. When a key color graphics pixel is received, the mask bit combination can be set to one of the video application modes, after which the video applications are able to store their respective pixels in the buffer, after first setting the mask bits to indicate ownership of the pixel location by the respective video application.

Alternatively, as will be appreciated by those skilled in the art, a single mask bit plane may be utilized as described hereinabove, along with a separate selection register having a number of bits sufficient to indicate which video source of a plurality of video sources should write into a pixel location in the buffer (for pixel locations that are owned by the video applications). If the mask bit indicates ownership by the graphics application, then in the manner described hereinabove video pixels are not stored in the buffer for a particular pixel location. If the mask bit is set by the receipt of a key color graphics pixel, however, the pixel location is owned by the video applications and the contents of the selection register for that particular pixel location will determine which video application will store its pixel in that location.

It will be understood that various changes in the details, materials, and arrangements of the parts and features which have been described and illustrated above in order to explain the nature of this invention may be made by those skilled in the art without departing from the principle and scope of the invention as recited in the following claims.

What is claimed is:

1. A computer-implemented process for processing signals for display using a single frame buffer, comprising the steps of:

(a) receiving a plurality of pixels, wherein one or more of the plurality of pixels corresponds to a first display and one or more of the plurality of pixels corresponds to a second display;

(b) generating a display bit map in accordance with the plurality of pixels; and (c) generating a display mask in accordance with the plurality of pixels, wherein:

if a pixel of the plurality of pixels corresponds to the first display and if a corresponding mask field of the display mask has a first-display value, then the pixel is stored in the display bit map, wherein the mask field comprises at least one mask bit;

else if the pixel corresponds to a key color, then the mask field corresponding to the pixel is set to the first-display value;

else the pixel is stored in the display bit map and the mask field corresponding to the pixel is set to a second-display value.

2. The process of claim 1, wherein the first display comprises a first image and the second display comprises a first graphics display.

3. The process of claim 2, further comprising the steps of:

(d) receiving a second plurality of pixels corresponding to a second image; and (e) updating the display bit map in accordance with the second plurality of pixels, wherein:

if a mask field of the display mask corresponding to a pixel of the second plurality of pixels has the first-display value, then the pixel of the second plurality of pixels is stored in the display bit map.

4. The process of claim 2, further comprising the steps of:

(d) receiving a second plurality of pixels corresponding to a second graphics display;

(e) updating the display bit map in accordance with the second plurality of pixels; and (f) updating the display mask in accordance with the second plurality of pixels, wherein:

if a pixel of the second plurality of pixels corresponds to the key color, then a mask field corresponding to the pixel of the second plurality is set to the first-display value;

else the pixel of the second plurality is stored in the display bit map and the mask field corresponding to the pixel of the second plurality is set to the second-display value.

5.The process of claim 2, wherein:

the display bit map and the display mask are stored in the single frame buffer; and each entry in the single frame buffer comprises a mask field and one or more pixel color components.

6. The process of claim 1, wherein the display bit map and the display mask are stored in the single frame buffer.

7. The process of claim 6, wherein each entry in the single frame buffer comprises a mask field and one or more pixel color components.

8. The process of claim 1, further comprising the step of:

(d) displaying the display bit map on a monitor.

9. The process of claim 1, wherein if the pixel corresponds to the first display and if the corresponding mask field of the display mask has the second-display value, then the mask field corresponding to the pixel is retained and the pixel is not stored in the display bit map.

10. The process of claim 1, wherein if the pixel corresponds to the key color, then the pixel is stored in the display bit map.

11. The process of claim 1, wherein:

the plurality of pixels corresponds to the first display, the second display, and one or more additional displays; and the mask field corresponding to each pixel of the plurality of pixels comprises two or more mask bits.

12. An apparatus for processing signals for display using a single frame buffer, comprising:

(a) means for receiving a plurality of pixels, wherein one or more of the plurality of pixels corresponds to a first display and one or more of the plurality of pixels corresponds to a second display;

(b) means for generating a display bit map in accordance with the plurality of pixels; and (c) means for generating a display mask in accordance with the plurality of pixels, wherein:

if a pixel of the plurality of pixels corresponds to the first display and if a corresponding mask field of the display mask has a first-display value, then the pixel is stored in the display bit map, wherein the mask field comprises at least one mask bit;

else if the pixel corresponds to a key color, then the mask field corresponding to the pixel is set to the first-display value;

else the pixel is stored in the display bit map and the mask field corresponding to the pixel is set to a second-display value.

13. The apparatus of claim 12, wherein the first display comprises a first image and the second display comprises a first graphics display.

14. The apparatus of claim 13, further comprising:

(d) means for receiving a second plurality of pixels corresponding to a second image; and (e) means for updating the display bit map in accordance with the second plurality of pixels, wherein:

if a mask field of the display mask corresponding to a pixel of the second plurality of pixels has a first-display value, then the pixel of the second plurality of pixels is stored in the display bit map.

15. The apparatus of claim 13, further comprising:

(d) means for receiving a second plurality of pixels corresponding to a second graphics display;

(e) means for updating the display bit map in accordance with the second plurality of pixels; and (f) means for updating the display mask in accordance with the second plurality of pixels, wherein:

if a pixel of the second plurality of pixels corresponds to the key color, then a mask field corresponding to the pixel of the second plurality is set to the first-display value;

else the pixel of the second plurality is stored in the display bit map and the mask field corresponding to the pixel of the second plurality is set to the second-display value.

16. The apparatus of claim 13, wherein:

the display bit map and the display mask are stored in the single frame buffer; and each entry in the single frame buffer comprises a mask field and one or more pixel color components.

17. The apparatus of claim 16, wherein:

the apparatus is connected to a host bus; and the host bus is connected to a host processor.

18. The apparatus of claim 12, wherein the display bit map and the display mask are stored in the single frame buffer.

19. The apparatus of claim 18, wherein each entry in the single frame buffer comprises a mask field and one or more pixel color components.

20. The apparatus of claim 12, further comprising:

(d) means for displaying the display bit map on a monitor.

21. The apparatus of claim 12, wherein:

the apparatus is connected to a host bus; and the host bus is connected to a host processor.

22. The apparatus of claim 12, wherein if the pixel corresponds to the first display and if the corresponding mask field of the display mask has the second-display value, then the mask field corresponding to the pixel is retained and the pixel is not stored in the display bit map.

23. The apparatus of claim 12, wherein if the pixel corresponds to the key color, then the pixel is stored in the display bit map.

24. The apparatus of claim 12, wherein:

the plurality of pixels corresponds to the first display, the second display, and one or more additional displays; and the mask field corresponding to each pixel of the plurality of pixels comprises two or more mask bits.

25. A storage medium encoded with machine-readable computer program code for processing signals for display using a single frame buffer, wherein, when the computer program code is executed by a computer, the computer implements the steps of:

(a) receiving a plurality of pixels, wherein one or more of the plurality of pixels corresponds to a first display and one or more of the plurality of pixels corresponds to a second display;

(b) generating a display bit map in accordance with the plurality of pixels; and (c) generating a display mask in accordance with the plurality of pixels, wherein:

if a pixel of the plurality of pixels corresponds to the first display and if a corresponding mask field of the display mask has a first-display value, then the pixel is stored in the display bit map, wherein the mask field comprises at least one mask bit;

else if the pixel corresponds to a key color, then the mask field corresponding to the pixel is set to the first-display value;

else the pixel is stored in the display bit map and the mask field corresponding to the pixel is set to a second-display value.

26. The storage medium of claim 25, wherein the first display comprises a first image and the second display comprises a first graphics display.

27. The storage medium of claim 26, wherein the computer further implements the steps of:

(d) receiving a second plurality of pixels corresponding to a second image; and (e) updating the display bit map in accordance with the second plurality of pixels, wherein:

if a mask field of the display mask corresponding to a pixel of the second plurality of pixels has the first-display value, then the pixel of the second plurality of pixels is stored in the display bit map.

28. The storage medium of claim 26, wherein the computer further implements the steps of:

(d) receiving a second, plurality of pixels corresponding to a second graphics display;

(e) updating the display bit map in accordance with the second plurality of pixels; and (f) updating the display mask in accordance with the second plurality of pixels, wherein:

if a pixel of the second plurality of pixels corresponds to the key color, then a mask field corresponding to the pixel of the second plurality is set to the first-display value;

else the pixel of the second plurality is stored in the display bit map and the mask field corresponding to the pixel of the second plurality is set to the second-display value.

29. The storage medium of claim 26, wherein:

the display bit map and the display mask are stored in the single frame buffer; and each entry in the single frame buffer comprises a mask field and one or more pixel color components.

30. The storage medium of claim 25, wherein the display bit map and the display mask are stored in the single frame buffer.

31. The storage medium of claim 30, wherein each entry in the single frame buffer comprises a mask field and one or more pixel color components.

32. The storage medium of claim 25, wherein the computer further implements the steps of:

(d) displaying the display bit map on a monitor.

33. The storage medium of claim 25, wherein if the pixel corresponds to the first display and if the corresponding mask field of the display mask has the second-display value, then the mask field corresponding to the pixel is retained and the pixel is not stored in the display bit map.

34. The storage medium of claim 25, wherein if the pixel corresponds to the key color, then the pixel is stored in the display bit map.

35. The storage medium of claim 25, wherein:

the plurality of pixels corresponds to the first display, the second display, and one or more additional displays; and the mask field corresponding to each pixel of the plurality of pixels comprises two or more mask bits.

36. An apparatus for processing signals for display, comprising:

(a) a single frame buffer; and (b) a processor; wherein:

the processor receives a plurality of pixels, wherein one or more of the plurality of pixels corresponds to a first display and one or more of the plurality of pixels corresponds to a second display;

the processor generates a display bit map in accordance with the plurality of pixels; and the processor generates a display mask in accordance with the plurality of pixels, wherein:

if a pixel of the plurality of pixels corresponds to the first display and if a corresponding mask field of the display mask has a first-display value, then the pixel is stored in the display bit map, wherein the mask field comprises at least one mask bit;

else if the pixel corresponds to a key color, then the mask field corresponding to the pixel is set to the first-display value;

else the pixel is stored in the display bit map and the mask field corresponding to the pixel is set to a second-display value.

37. The apparatus of claim 36, wherein the first display comprises a first image and the second display comprises a first graphics display.

38. The apparatus of claim 37, wherein:

the processor receives a second plurality of pixels corresponding to a second image; and the processor updates the display bit map in accordance with the second plurality of pixels, wherein:

if a mask field of the display mask corresponding to a pixel of the second plurality of pixels has a first-display value, then the pixel of the second plurality of pixels is stored in the display bit map.

39. The apparatus of claim 37, wherein:

the processor receives a second plurality of pixels corresponding to a second graphics display;

the processor updates the display bit map in accordance with the second plurality of pixels; and the processor updates the display mask in accordance with the second plurality of pixels, wherein:

if a pixel of the second plurality of pixels corresponds to the key color, then a mask field corresponding to the pixel of the second plurality is set to the first-display value;

else the pixel of the second plurality is stored in the display bit map and the mask field corresponding to the pixel of the second plurality is set to the second-display value.

40. The apparatus of claim 37, wherein:

the display bit map and the display mask are stored in the single frame buffer; and each entry in the single frame buffer comprises a mask field and one or more pixel color components.

41. The apparatus of claim 40, wherein:

the apparatus is connected to a host bus; and the host bus is connected to a host processor.

42. The apparatus of claim 36, wherein the display bit map and the display mask are stored in the single frame buffer.

43. The apparatus of claim 42, wherein each entry in the single frame buffer comprises a mask field and one or more pixel color components.

44. The apparatus of claim 36, further comprising:

(d) a monitor, wherein the display bit map is displayed on the monitor.

45. The apparatus of claim 36, wherein:

the apparatus is connected to a host bus; and the host bus is connected to a host processor.

46. The apparatus of claim 36, wherein if the pixel corresponds to the first display and if the corresponding mask field of the display mask has the second-display value, then the mask field corresponding to the pixel is retained and the pixel is not stored in the display bit map.

47. The apparatus of claim 36, wherein if the pixel corresponds to the key color, then the pixel is stored in the display bit map.

48. The apparatus of claim 36, wherein:

the plurality of pixels corresponds to the first display, the second display, and one or more additional displays; and the mask field corresponding to each pixel of the plurality of pixels comprises two or more mask bits.

* * * * *